Dec. 9, 1941. W. C. GUTHRIE 2,265,728
BALED HAY AND STRAW HOOK
Filed Aug. 8, 1941

W. C. Guthrie deceased,
Inventor.
M. M. Guthrie
Administratrix.
BY Knowles.

Patented Dec. 9, 1941

2,265,728

UNITED STATES PATENT OFFICE 2,265,728

BALED HAY AND STRAW HOOK

William C. Guthrie, deceased, late of Dublin, Va., by Mattie M. Guthrie, administratrix, Dublin, Va.

Application August 8, 1941, Serial No. 406,070

2 Claims. (Cl. 294—105)

This invention relates to a hook designed primarily for use in loading and unloading baled hay, straw or the like.

The primary object of the invention is to provide a hook of this character which may be forced into a bale of hay, straw or the like, to securely hold the bale while it is being transferred from one place to another.

An important object of the invention is to provide a bale hook of this character having means for forcing the bale into which the hook is embedded, from the hook, when the bale has been moved to the place of deposit, thereby providing a bale-handling device which will greatly facilitate the loading and unloading of baled hay or straw.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing—

Figure 1:
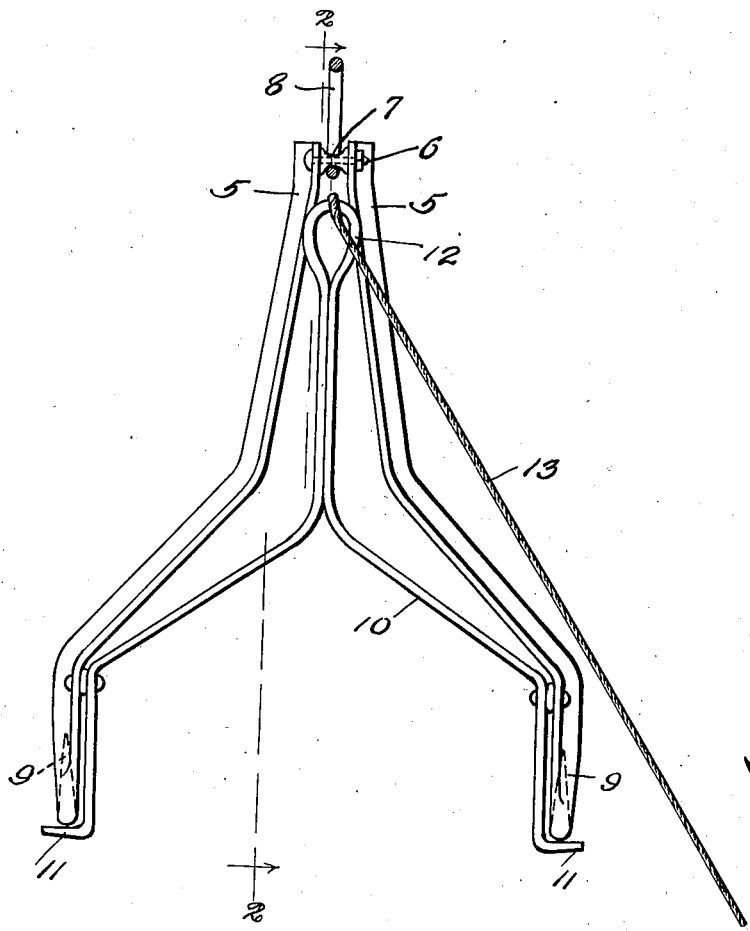
Figure 1 is a rear elevational view of a hook constructed in accordance with the invention.

Referring to the drawing in detail, the hook comprises a body portion including a pair of arms 5 which are connected by means of the bolt 6, near one of the ends of the body portion, there being provided a spacer 7 between the arms 5 for holding the arms in predetermined spaced relation. As shown, this spacer 7 is curved, providing a bearing for the ring 8 by means of which the hook may be connected with a cable or chain.

The arms 5 diverge from the point of connection, and are spaced an appreciable distance apart at their free ends.

Formed integral with the free ends of the arms are substantially long upwardly inclined hooks 9 which are adapted to be inserted in the bale which is being lifted and moved by the body portion.

Pivotally mounted on the body portion, and connected to the arms at points adjacent to the hooks 9, is a clearing fork 10 which also embodies a pair of arms which diverge toward the free ends thereof. The extremities of the arms forming the clearing fork 10, are extended laterally toward the arms 5, providing fingers 11, which fingers are of lengths to extend beyond the outer surfaces of the hooks 9.

Figure 2:
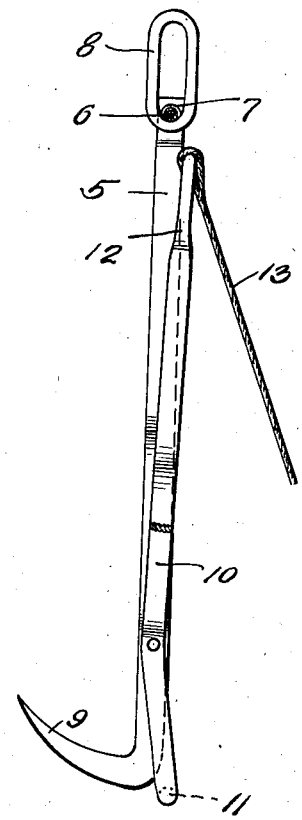
Figure 2 is a sectional view taken on line 2—2 of Figure 1.

The free ends of the clearing fork, are extended slightly rearwardly as shown by Figure 2 of the drawing, so that the fingers 11 will normally lie at a point spaced from the forward surfaces of the arms 5, providing ample clearance so that the clearing fork, will not retard the movement of the hooks 9, into the bale which is being lifted by the device.

It will also be seen that due to the construction and location of the fingers 11, the fingers 11 may swing forwardly directly under the outer curved surfaces of the hooks 9. It will be obvious that a bale into which the hooks 9 have been embedded, will be forced from the hooks, by the forward movement of the fingers 11.

The clearing fork is provided with an eye 12 through which the cable 13 extends, the cable being secured to the clearing fork in such a way that when the cable is pulled, the free end of the clearing fork will be swung forwardly along the outer curved surfaces of the hooks 9, to remove the bale into which the hooks have been embedded.

In the use of the device, the hooks 9 are forced into a bale of hay or straw to be loaded or unloaded. The elevating cable, not shown, and which is attached to the ring 8, is now operated to move the device, together with the bale, to a place of deposit. After the bale has been lowered to a supporting surface, the cable 13 is pulled causing the fingers 11 to move into engagement with the bale and force the bale from the hooks 9.

Due to this construction, it will be seen that it is not necessary to regulate the slack in the lifting cable which is connected to the ring 8, in order to remove the bale from the hooks 9. Neither is it necessary to lift the bale or lower the hooks 9 in order to disconnect the hooks from the bale.

What is claimed is:

1. A hook of the class described, comprising diverging arms, forwardly extended hook members formed at the free ends of the arms, a pivoted clearing fork mounted on the body portion and operating adjacent to the hook members, laterally extended fingers formed at the free ends of the clearing fork, said fingers being adapted to move under the hooks forcing a bale from the hooks.

2. A hook of the class described, comprising diverging arms, upwardly inclined hooks at the free ends of the arms, said hooks being adapted to extend into bales of material to be loaded or unloaded, a clearing fork embodying diverging arms, pivotally connected with the first mentioned arms, laterally extended fingers formed on the free ends of the clearing fork, said fingers being adapted to move under the hooks of the body portion, forcing the bale from the hooks, and an operating cable connected with the clearing fork by means of which the clearing fork is operated.

MATTIE M. GUTHRIE,
*Administratrix of the Estate of William C. Guthrie, Deceased.*